No. 76,624. PATENTED APR. 14, 1868.
J. GECMEN.
APPARATUS FOR SPROUTING MALT.
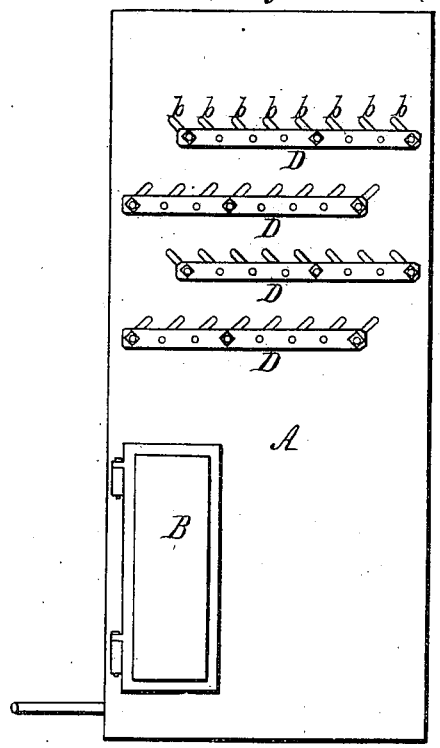
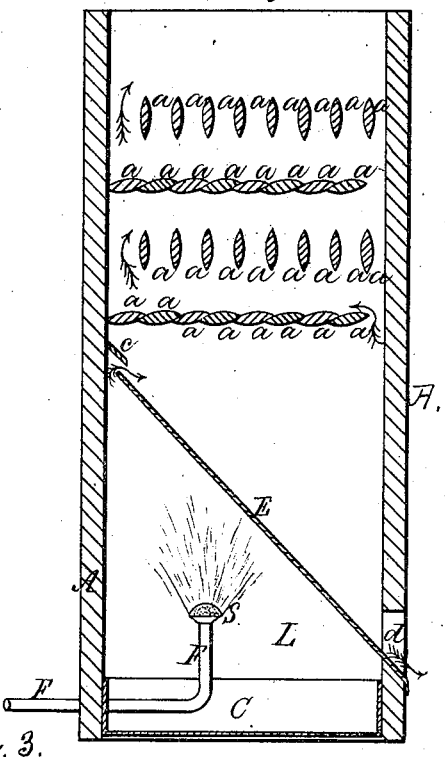
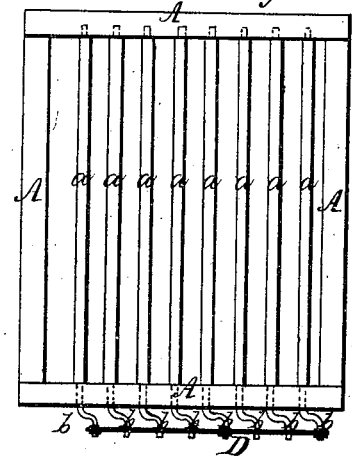
Witnesses.
J. N. Herthel.
N. E. Maus
Inventor.
Jos Gecmen

United States Patent Office.

JOSEPH GECMEN, OF CHICAGO, ILLINOIS.

*Letters Patent No. 76,624, dated April 14, 1868.*

---

IMPROVED APPARATUS FOR SPROUTING MALT.

---

*The Schedule referred to in these Letters Patent and making part of the same.*

---

TO ALL WHOM IT MAY CONCERN:

Be it known that I, JOSEPH GECMEN, of Chicago, in the county of Cook, and State of Illinois, have invented a new and useful Improvement in Apparatus for Sprouting Malt; and I do hereby declare and make known that the following is a full, clear, and exact description of the same, reference being had to the accompanying drawings, and the letters and figures marked thereon, which form part of this specification.

My invention consists in a novel apparatus, in which barley may be subjected to the sprouting process preparatory to being dried in a kiln.

To enable those skilled in the art to understand how to construct and use my invention, I will proceed to describe the same with particularity, making reference, in so doing, to the aforesaid drawings, in which—

Figure 1 represents a side elevation of my invention,

Figure 2 is a vertical central section of the same, and

Figure 3 is a plan or top view thereof.

Similar letters of reference in the several figures denote the same parts of my invention.

A represents the wall enclosing the apparatus, which may be of any suitable material, and of any required size and height, and which is provided with a door, B, through which a person may enter into the said enclosure of the apparatus. In the bottom of said enclosure is a large shallow vessel, covering or substantially covering the area enclosed by the walls, which is made to contain water. Into this vessel a steam-pipe may be introduced, so as to keep the water at the proper temperature in winter; and there is also a water-pipe, F, provided with a sprinkler, S, through which water is injected, as shown, forming a spray, filling the air with moisture, which, passing up through the barley, causes it to sprout, as desired. One or more of these jets or fountains may be used, according to the size or capacity of the apparatus.

In the upper part of the apparatus is arranged a series of floors, each being composed of narrow sections, $a$, supported upon journals at each end, so as to be tipped up edgewise, when desired, to allow the grain to drop down below.

Upon one end of each of the sections composing each floor, a crank, $b$, projects through the walls of the apparatus, upon which is fixed a bar, D, so that, by moving said bars, the floors, respectively, may be closed or opened, as desired. Below the said floors is an inclined chute, upon which the sprouted grain goes out of the apparatus at $d$. At its upper end is an opening, through which the moist air rises and permeates the grain lying upon the floors, a chute, $c$, directly over said opening, preventing the grain from falling through into the water, as shown.

The number of floors should be about double the number required to spread the quantity of barley to be sprouted, the middle floor and those above being filled. Then the grain upon each floor should be let down upon the floor immediately below once in about six hours, until the whole is moved—successively lowered—into the lower half of the series, when it is precipitated upon the chute E, and goes out of the apparatus; or, if desired, fewer floors may be used, the grain going out being carried up by an elevator, and passed through the apparatus until sprouted sufficiently, as desired.

It will be observed that the moistened air can pass freely through the interstices in the floors, so as to come in contact with all the grain upon the floor.

The grain must first be soaked before being put into the apparatus.

Having described the construction and operation of my invention, I will now specify what I claim, and desire to secure by Letters Patent.

1. In combination with a water-chamber, L, and chute E, I claim the arrangement of a series of floors, constructed substantially as and for the purposes set forth.

2. I claim the combination of a series of floors, constructed as described, with a chamber, L, and fountain S, substantially as and for the purposes described.

JOS. GECMEN.

Witnesses:
W. E. MARRS,
L. L. COBURN.